(12) United States Patent
Chung

(10) Patent No.: US 7,053,645 B2
(45) Date of Patent: May 30, 2006

(54) SYSTEM AND METHOD FOR DETECTING DEFECTS IN A THIN-FILM-TRANSISTOR ARRAY

(75) Inventor: Kyo Young Chung, San Jose, CA (US)

(73) Assignee: YieldBoost Tech, Inc., San Jose, CA (US)

( * ) Notice: Subject to any disclaimer, the term of this patent is extended or adjusted under 35 U.S.C. 154(b) by 0 days.

(21) Appl. No.: 10/455,359

(22) Filed: Jun. 6, 2003

(65) Prior Publication Data

US 2004/0246015 A1 Dec. 9, 2004

(51) Int. Cl.
*G01R 31/00* (2006.01)

(52) U.S. Cl. ..................... 324/764; 324/770

(58) Field of Classification Search ............. 324/765, 324/768–770, 71.3, 158.1; 349/187, 192; 438/14, 17–18

See application file for complete search history.

(56) References Cited

U.S. PATENT DOCUMENTS

| | | | | |
|---|---|---|---|---|
| 5,235,272 A * | 8/1993 | Henley | .................. | 324/770 |
| 5,377,030 A * | 12/1994 | Suzuki et al. | .............. | 349/187 |
| 5,546,013 A * | 8/1996 | Ichioka et al. | ............. | 324/770 |
| 5,550,484 A * | 8/1996 | Mitsumori et al. | ......... | 324/769 |
| 5,608,558 A * | 3/1997 | Katsumi | .................. | 349/192 |
| 5,734,450 A * | 3/1998 | Irie et al. | ................... | 349/39 |
| 5,831,605 A * | 11/1998 | Yasui et al. | ................ | 345/211 |
| 6,424,330 B1 * | 7/2002 | Johnson | ..................... | 345/96 |
| 6,630,840 B1 * | 10/2003 | Tomita | ...................... | 324/765 |
| 6,798,231 B1 * | 9/2004 | Iwasaki et al. | ............ | 324/770 |

* cited by examiner

*Primary Examiner*—Minh N. Tang
(74) *Attorney, Agent, or Firm*—Fleshner & Kim LLP

(57) ABSTRACT

A system and method for detecting a defect in a transistor array includes applying a test signal to the array, monitoring pixel voltages along a gate line of the array, and detecting a defect associated with the gate line based on a variation in the pixel voltages along the gate line during the monitoring step. The system and method can also detect a precise location of the defect based on a rate of change in the variation of the pixel voltages along the gate line.

29 Claims, 12 Drawing Sheets

Simplified equivalent circuit of one cross point in TFT array

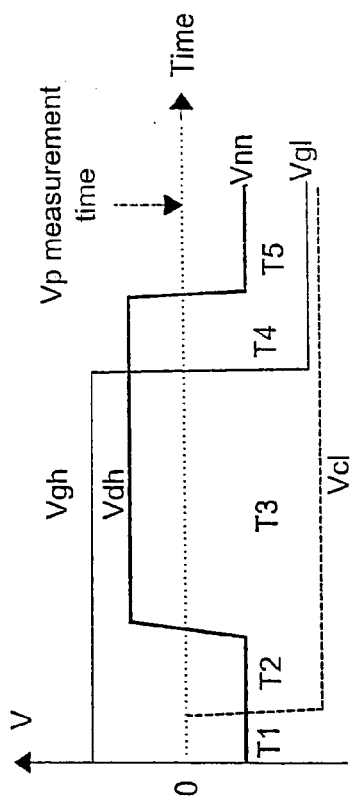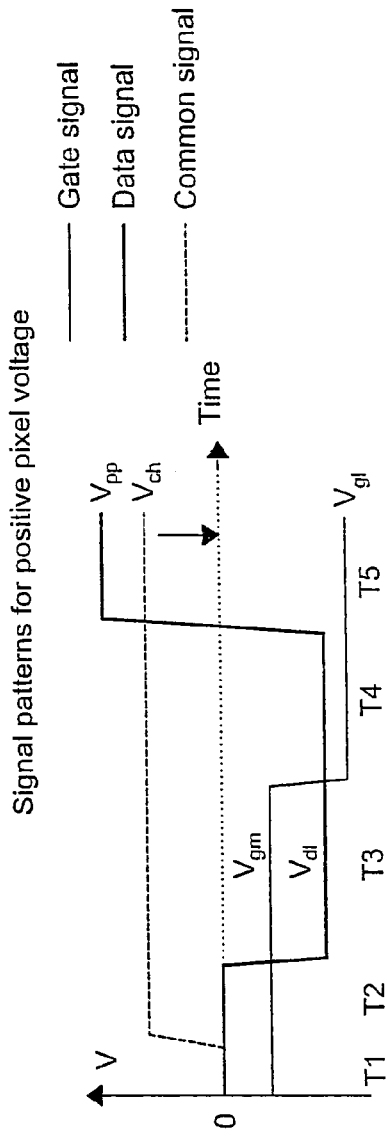
FIG. 4(a) Signal patterns to detect the short defect between gate and common lines.
FIG. 4(b) Signal patterns for positive pixel voltage / Signal patterns for negative pixel voltage

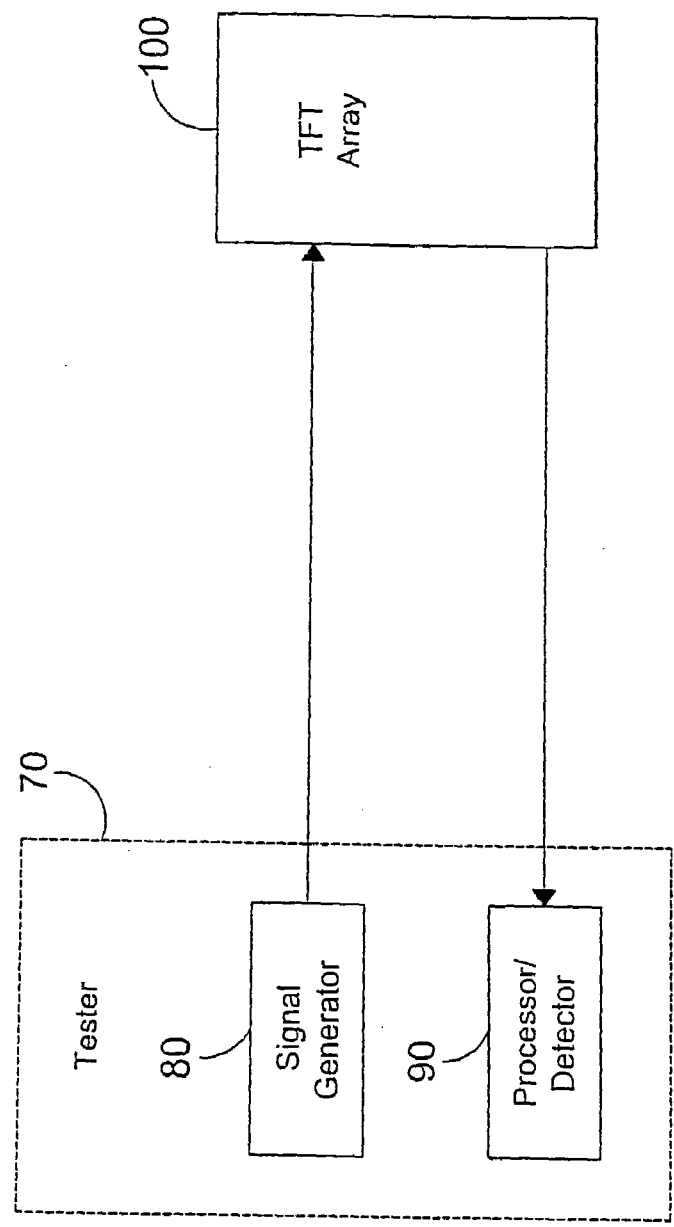

_US 7,053,645 B2_

SYSTEM AND METHOD FOR DETECTING DEFECTS IN A THIN-FILM-TRANSISTOR ARRAY

BACKGROUND OF THE INVENTION

1. Field of the Invention

This invention generally relates to testing electronic circuits, and more particularly to a system and method for detecting defects in circuits which include one or more transistor arrays.

2. Description of the Related Art

Because of their small size and superior performance, thin-film-transistor (TFT) arrays have evolved as a preferred technology for a variety of applications including but not limited to flat-panel LCD displays and imaging and sensing systems used in consumer electronics.

During the manufacturing process, defects may develop which, if left unaddressed, may diminish the performance of the array. These defects include electrical shorts between the gate and common lines connecting the transistors and their associated storage elements. The need to test for defects becomes more important as the number of transistors in the array increases. This may be attributable to several factors. One is that the probability of a short developing tends to vary linearly with the length of the gate and common lines. The number of these lines and their proximity to one another also plays a role in increasing the chances of a short occurring. For example, in a double-gate or double-common-line configuration, the gap between the gate and common lines is likely to be narrower than in single-gate-line and single-common-line layouts. The likelihood of a short developing consequently increases.

Once a short has been located in a TFT array, it can be repaired by cutting the short. Existing methods for locating shorts and other defects in transistor arrays, however, have proven to be inaccurate. This is especially true of shorts between the gate and common lines of the array, as this type of defect does not give off a distinctive signal at the affected pixel location which can be detected by existing methods. As a result, the defect may never be located or at best may only be detected to lie within a certain general area which includes other pixel elements that are properly functioning. Because of this imprecision, the defect may not be able to be corrected because it cannot be located with any degree of accuracy. In a worst case, an attempt to eliminate the defect may result in destroying a properly functioning portion of the array, thereby compounding the problem and in many cases rendering the transistor array unusable for all intents and purposes.

In view of the foregoing considerations, it is apparent that there is a need for a system and method for, first, detecting the existence of a defect in a thin-film-transistor array and, second, accurately detecting a location of the defect so that corrective action may be taken without disturbing other portions of the array that are properly functioning.

SUMMARY OF THE INVENTION

An object of the present inveniton is to improve the accuracy and efficiency of testing of electronic circuits including ones containing transistor arrays.

Another object of the present inveniton is to provide a system and method for accurately detecting defects in a transistor array including but not limited to a thin film transistor array.

Another object of the present invention is to provide a system and method for determining a type of defect in a transistor array.

Another object of the present invention is to provide a system and method for precisely determining a location of a defect in a transistor array during a testing procedure.

These and other objects and advantages of the present invention are achieved by providing a method for detecting a defect in a transistor array which in accordance with one embodiment includes applying a test signal to the array, monitoring pixel voltage along a gate line of the array, and detecting a defect associated with the gate line based on a variation in the pixel voltage during the monitoring step. The defect may be a short between the gate line and a common line of the array. The gate line and common line may be associated with a same pixel element or different pixel elements. The method further includes detecting a location of the defect based on a rate of change in the variation of the pixel voltage along the gate line. The rate of change may be measured in any one of a variety of ways. For example, the rate of change may be measured as a sudden increase or decrease of the pixel voltage or as a change in slope of a pixel voltage profile. Alternatively, the location of the defect may correspond to the pixel voltage hitting a minimum or maximum value as determined by a set of profile curves plotted by a signal analyzer connected to the transistor array. The transistor array may be a TFT array or another type of circuit which includes an array of transistors connected, for example, in a matrix pattern.

In accordance with another embodiment, the present invention is a system for detecting a defect in a transistor array. The system includes a signal generator for applying a test signal to the array and a detector for detecting a defect in the array based on a variation in pixel voltage along an array gate line. The defect may be a short between the gate line and a common line of the array. The gate line and common line may be associated with a same pixel element or different pixel elements. The detector further detects a location of the defect based on a rate of change in the variation of the pixel voltage along the gate line. The rate of change may be measured in any one of a variety of ways. For example, the rate of change may be measured as a sudden increase or decrease of the pixel voltage or as a change in slope of a pixel voltage profile. Further, the location of the defect may correspond to the pixel voltage hitting a minimum or maximum value as determined by a set of profile curves plotted by a signal analyzer connected to the transistor array.

In accordance with another embodiment, the present invention is a signal analyzer for testing a TFT array. The signal analyzer includes at least one electrode for inputting a test signal into the TFT array and a processor which monitors a variation in pixel voltage along a gate line of the array and detects a defect associated with the gate line based on the pixel voltage variation. The signal analyzer may detect any of the types of defects previously mentioned, using one or more of the previously mentioned techniques.

BRIEF DESCRIPTION OF THE DRAWINGS

FIGS. 4(a) and 4(b) are graphs showing exemplary test signal patterns that may be applied to a TFT array for purposes of detecting shorts between gate and common lines in accordance with the present invention.

FIG. 11 shows a tester for detecting defects in a TFT array in accordance with one embodiment of the present invention.

DESCRIPTION OF THE PREFERRED EMBODIMENTS

The present invention relates to a system and method for detecting a defect in an electronic circuit containing an array of transistors, and then accurately determining a location of the defect so that corrective action may be taken without disturbing other portions of the circuit that are properly functioning. The system and method are particularly well suited to detecting shorts that form between signal-carrying lines during the manufacturing process. The signal-carrying lines include but are not limited to gate lines and common lines, however the detection of defects in other portions of the circuit is also possible. For example, the present invention may be implemented to detect at least the following types of opens and shorts: gate line open, common line open, local drain electrode open, local source electrode open, local gate electrode open, local gate-drain short, local gate-source short, local drain-source short, Indium-Tin-Oxide (ITO) pixel electrode-gate line short, ITO pixel electrode-data line short, Cst short through the insulator between ITO pixel electrode and common line metal, a pinhole in a gate insulator, a gate-to-data line short, and data line-to-common line short.

Additional defects which are detectable by the present invention in circuits having transistor arrays include: local semiconductor island missing, local contact layer (such as n+ layer) absence, damaged Cst electrode, data—data line short, local n+ layer short, ITO—ITO short over data line, ITO—ITO short over gate line, a partial ITO pixel electrode absence, partial overlap between data line and ITO pixel electrode without short, and a partial overlap between gate line and ITO pixel electrode without short.

The present invention is ideally suited for use in detecting the existence and then determining with pinpoint accuracy the location of shorts in a TFT array used in a display such as a flat-panel LCD display. The invention, however, is not intended to be limited to this specific transistor-array application. On the contrary, the system and method of the present invention may advantageously be used to determine the existence and location of defects in TFT arrays used in virtually any other application. For convenience purposes, the remaining portion of this disclosure addresses the application of a TFT array in a display panel.

Figure 1A:
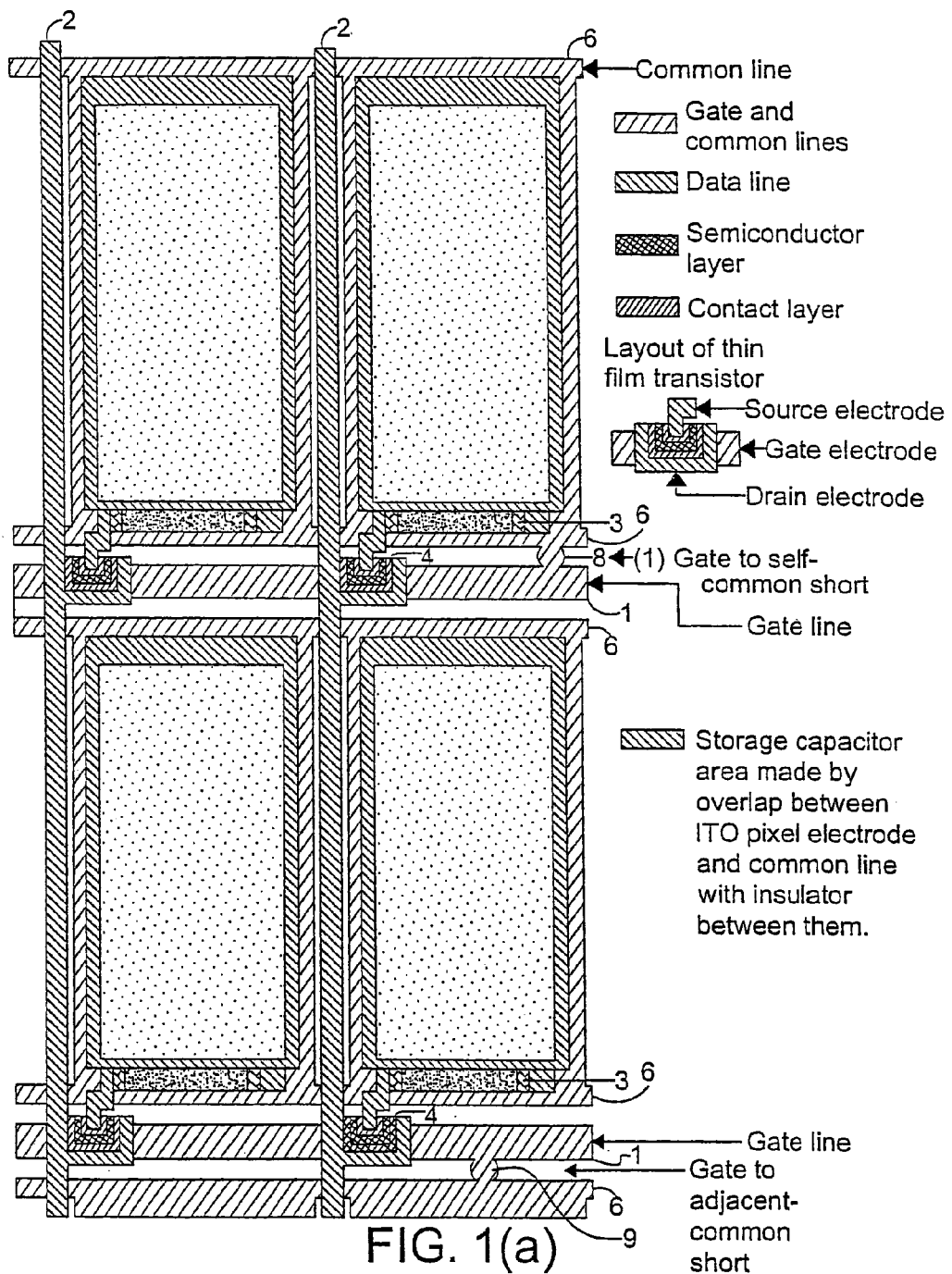
FIG. 1(*a*) is a diagram showing a portion of a thin-film-transistor array that includes elements for controlling the illumination of four corresponding pixel locations in a flat-panel LCD display screen and two types of gate-to-common short defects in TFT array, and FIG. 1(*b*) is a diagram showing the pixel layout in different process steps of the TFT array of FIG. 1(*a*).
Figure 1B:
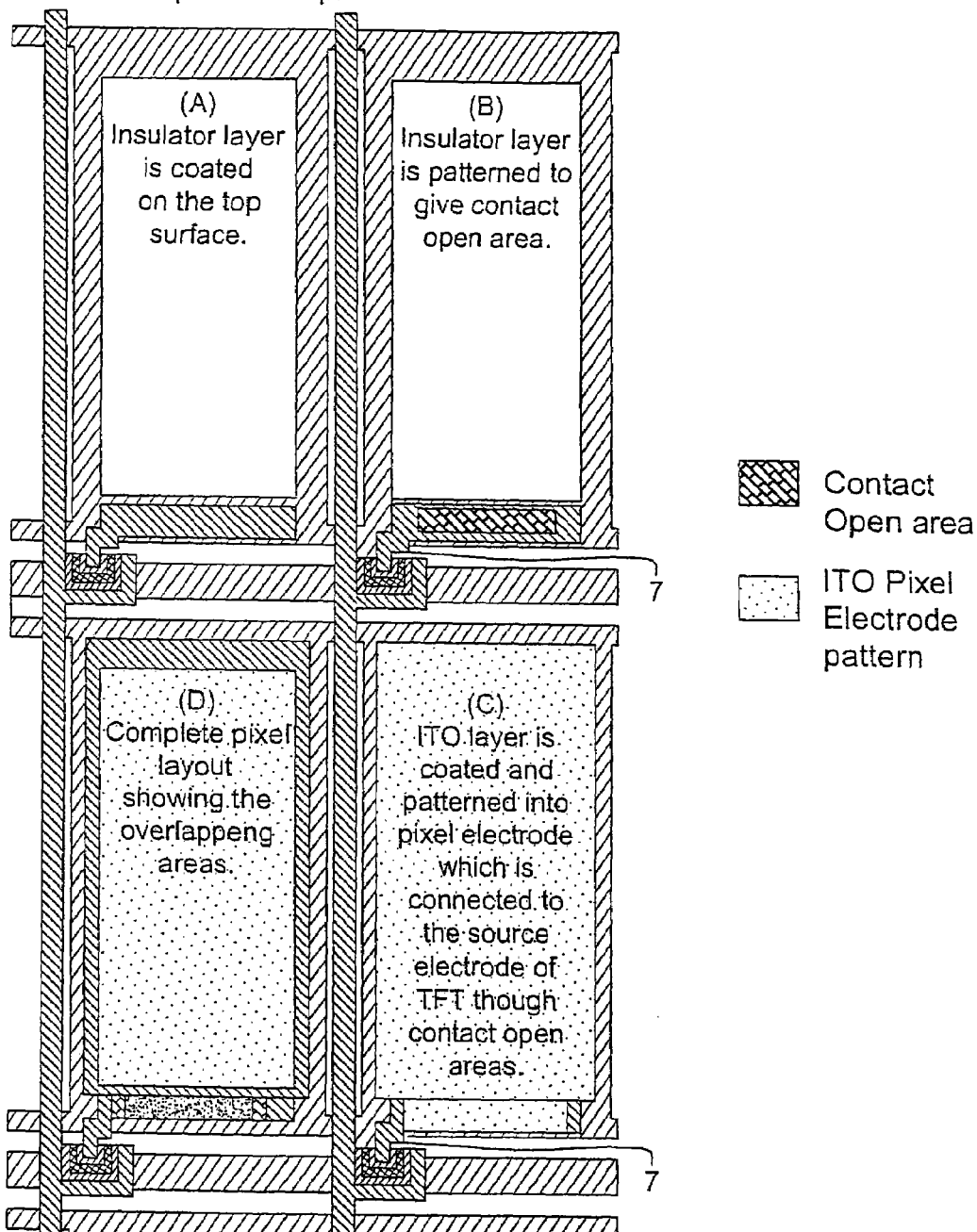

FIG. 1(a) is a diagram showing a portion of a exemplary thin-film-transistor array that includes elements for controlling the illumination of four corresponding pixel locations in a flat-panel LCD display screen and two types of the gate to common short defects in TFT array. In order to better understand FIG. 1(a), reference may be made to FIG. 1(b) which shows the pixel layout in different process steps of the TFT array of FIG. 1(a).

The array includes a plurality of gate lines 1 and data lines 2 arranged in the form of a matrix. Each point of intersection between these lines include a storage element 3 connected to a switching transistor 4. The storage element includes a capacitor which stores a voltage value that activates an associated liquid crystal material, which is added in the cell process, when the transistor is switched off. The liquid crystal material is sandwiched between an ITO pixel electrode and another ITO electrode on the opposing glass which is placed against TFT array glass in the cell assembly process. The gate lines control switching of the transistors and the data lines provide image signal data. The array also includes a plurality of common lines 6 situated parallel to the gate lines and connected to the storage capacitor of each pixel along respective rows of the array. The common lines function to provide the reference electric potential for the storage capacitor. Reference numeral 7 corresponds to a metal pattern connecting the source electrode of TFT and ITO pixel electrode via a contact open area illustrated in FIG. 1(b).

The array shown in FIG. 1(a) has what is commonly referred to as a double common-line layout, since each row of pixels has double-common lines connected to the storage capacitors and each gate line is placed between self- and adjacent-common lines. While the system and method of the present invention are ideally suited to detecting the existence and location of errors in a TFT array of this type, those skilled in the art can appreciate that the invention may just as easily be applied to TFT arrays having other configurations including but not limited to the layouts of single-common line, single-gate line, and double-gate line where each row of pixels has double-gate lines connected to the TFT gate electrodes and each common line is placed between upper and lower self-gate lines.

Figure 2:
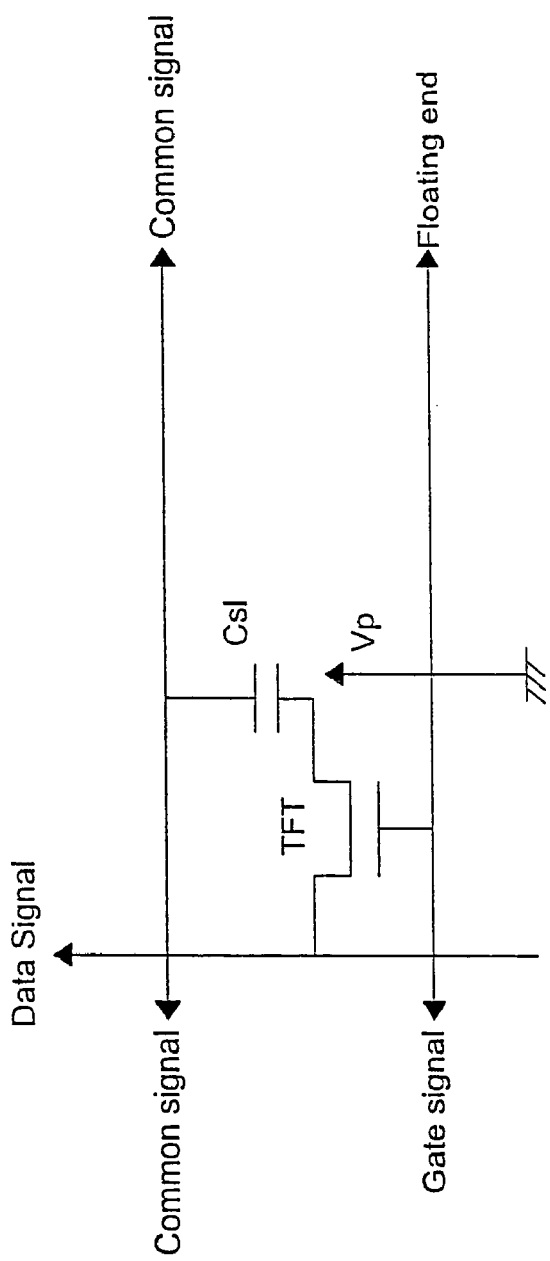
FIG. 2 is a diagram showing an equivalent circuit for the elements at each point of intersection of the thin-film-transistor array of FIG. 1.

FIG. 2 is an equivalent circuit diagram showing elements included at each point of intersection of the array. In this diagram, the storage capacitor is labeled Cst and the transistor TFT. For illustrative purposes, the pixel voltage $V_p$ is shown as corresponding to the storage capacitor voltage. In operation, when a gate signal switches the TFT on, Cst is charged to the image signal voltage present on the data signal line at that time. Liquid crystal material controls the amount of light passing through the ITO electrodes and operation of liquid crystal material is controlled by the voltage applied across the ITO electrodes. After the TFT is turned off, the voltage across the ITO electrodes can be maintained until a next turn-on time with help from Cst for charge holding. Each gate line controls the turning on and off of all the TFTs connected to it and a scanning signal is applied to one gate line at a time sequentially.

As previously explained, during the manufacturing process it is possible for defects to form in the TFT array. One defect that is particularly troublesome is a short between the gate and common lines. At least two types of shorts are possible. One short can form between a common line and gate line of the same pixel element. This type of short is illustratively shown by metal residue 8 in FIG. 1(*a*) and may be referred to as a gate to self-common line short. Another short can form between the gate line of one pixel element and the common line of another pixel element. This type of short is illustratively shown by metal residue 9 in FIG. 1(*a*) and may be referred to as a gate to adjacent-common line short.

Figure 3:
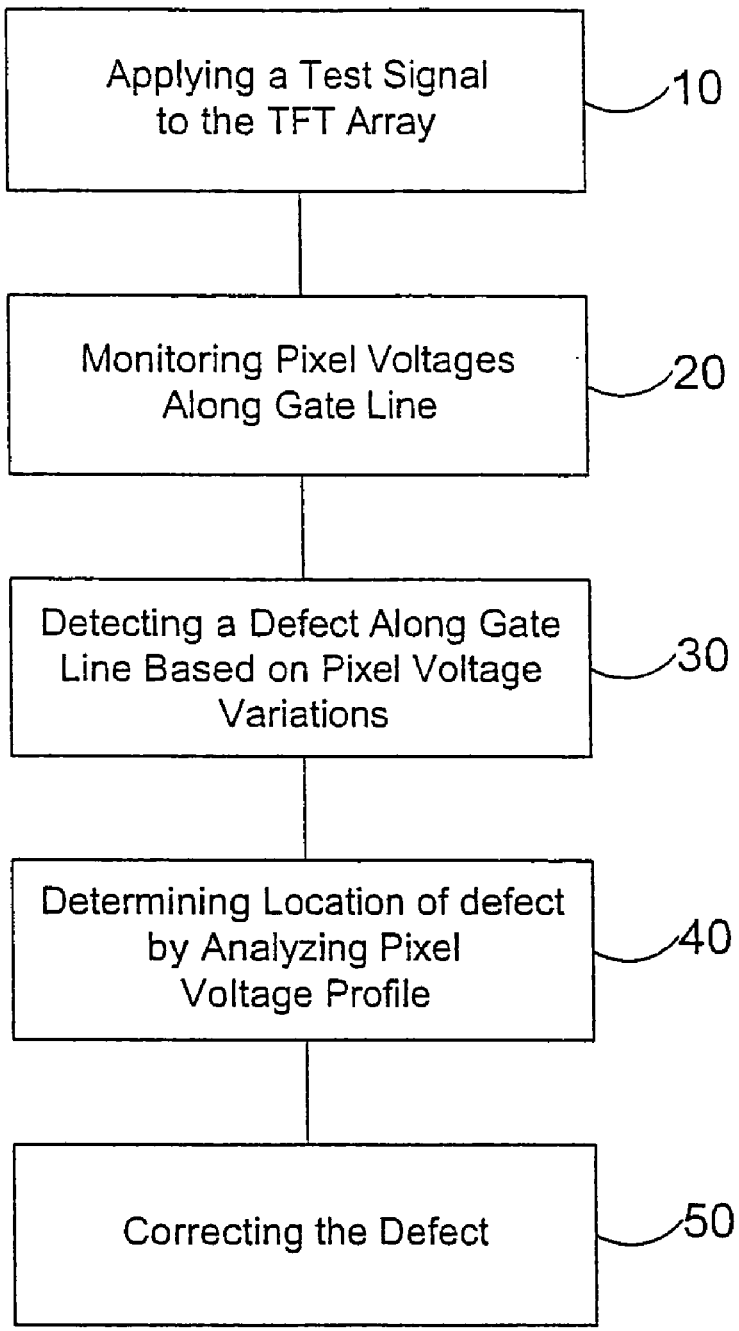
FIG. 3 is a flow diagram showing steps included in a method for detecting the existence of a short between a gate line and common line of a TFT array in accordance with one embodiment of the present invention.

FIG. 3 shows steps included in a method for detecting the existence of a short between a gate line and common line of a TFT array in accordance with one embodiment of the present invention. These steps may be equally applied to both types of shorts mentioned above. The method includes as an initial step applying a test signal to the array. (Block 10). The test signal may be applied to one or more lines of the array. Signal patterns are applied to the gate, data, and common lines in sequence for each row of the array or in multiple rows at the same time. The test voltages in the pattern are set to allow signals indicative of the existence of defect along the gate lines to produce a distinctive pattern which may be identified and measured by a detector.

A second step of the method includes monitoring the pixel voltages along each gate line as the test signals are applied. (Block 20). When no defect exists along the gate lines, the pixel voltages are expected to produce a certain signal profile, depending on the magnitude and frequency of the test signals applied. For example, the pixel voltage profile monitored along the gate lines may have a constant value when no gate-to-common-line short exists. On the other hand, when such a defect exists a different profile may be identified and detected. For example, as will be discussed in greater detail below the profile of the pixel voltages monitored along a gate line under test may follow a predictable variation.

A third step of the method includes detecting a defect associated with the gate line based on the variation in pixel voltage detected during the monitoring step. (Block 30). For example, under certain circumstances and test voltage patterns, the pixel voltage may vary linearly starting from a feeding end of the line. When this occurs, a high degree of probability exists that a defect exists along the gate line under test. As previously mentioned, the gate line and common line may be connected to a same pixel element in which case one profile variation is produced. If the gate and common lines are connected to different pixel elements, a different profile variation may be produced. The specific variation detected provides a basis for determining, for example, not only that a defect exists along the gate line but also what specific type of defect exists, e.g., a gate line to self-common line short or a gate line to adjacent-common line short.

A fourth step of the method includes determining a location of the defect along the gate line under test. (Block 40). The location of the defect may be determined by further analyzing the pixel voltage profile of the affected gate line. For example, in one implementation the pixel voltage profile may continue to vary linearly along the gate line up to a point where the defect exists. At this point, a detectable change in the profile may occur, e.g., the profile may change slope or the rate of variation may change. Alternatively, it may be determined that the profile hit a maximum or minimum value depending, for example, on whether the test signals applied correspond to a positive or negative pixel voltage. Because a close correspondence exists between the profile and points along the gate line being tested, the location of defects may be detected with precision based on detectable profile variations.

A fifth step includes correcting or otherwise eliminating the defect. (Block 50). If the defect is a short, this step may include cutting the short with any one of a variety of known cutting tools. Other known methods for correcting defects may also be employed.

The method of the present invention may be modified in various ways. For example, in an alternative embodiment the pixel voltage profile may be measured indirectly and some of the signal patterns in FIGS. 4(*a*) and (*b*) are modified accordingly. In some TFT array test equipment used in manufacturing line, the pixel voltage is measured through some medium such as optical modulator or electron beam to detect the defect location. In some other TFT array test equipment used in manufacturing line, the defect location is detected by sensing the amount of charge stored in the storage capacitor after charging operation. In order to apply the present invention to this charge sensing technology, the pixel voltage profile described in the present invention needs to be obtained through the information obtained from the charge sensing operation. One of the methods to obtain the pixel voltage profile through the charge sensing technique is to switch the data line into some reference electric potential at Vp measurement time at FIG. 4 and scan one gate line at a time so that the charge flow to the reference electric potential is measured. The amount of charge flow then reflects the pixel voltage on storage capacitor. Scanning the gate line can be done by raising the Vg and Vcom signals by the same magnitude at the same time in case of FIG. 4(*a*). This way of scanning drives the TFTs and storage capacitors on the gate line in equal condition even if there is a short between the gate and common lines.

Specific examples of the method of the present invention will now be discussed. These examples are provided merely for purposes of illustrating how the invention may be applied in various exemplary contexts and therefore are not intended to limit the invention in any way. In discussing these examples, reference may be made to the aforementioned drawings.

As previously discussed, FIG. 1 shows two types of gate-to-common line shorts in a TFT array having a double common-line layout. For both types of shorts, it may be assumed that all the gate lines are connected together by gate shorting bar. The shorting bar connects the metal lines of the same signal together electrically by a low-resistance metal bar-shaped pattern in the perimeter of TFT array area. The shorting bars are currently used for the gate and data lines by many TFT-LCD manufacturers to decrease the number of test probes to the gate and data lines or reduce the damage due to ESD (electro-static discharge) problem. The shorting bars are eventually removed in a later process.

It may also be assumed that all the common lines are connected together because they are normally connected by the TFT panel layout without shorting bar. In one variation, even and odd gate lines may be respectively connected by even and odd gate shorting bars and similar methodology as explained herein may be applied. When the shorting bar is not used, pixel charging and discharging are performed row by row and similar methodology may also be applied. FIG. 2 shows an equivalent circuit for one cross point in the TFT array, where TFT and Cst indicate the thin film transistor and storage capacitor for each pixel respectively.

FIGS. 4(a) and 4(b) show test signal patterns that may be applied to the TFT array for purposes of detecting short defects between the gate and common lines. More specifically, FIG. 4(a) shows a test signal pattern that may be applied for a positive pixel voltage and FIG. 4(b) shows a test signal pattern that may be applied for a negative pixel voltage. As the legends show, the thick and thin lines in these graphs represent signal patterns that may be applied to the data and gate shorting bars respectively and the dashed line represents the signal pattern applied to the common signal pad. These shorting bars are intentionally formed in the TFT array for purposes of testing or reducing ESD damage and are preferably laid out along a perimeter of TFT array area. To locate defects, test signals may be provided to multiple signal lines through the shorting bars. (These shorting bars are in contrast to the short defects that the invention is applied to detect and repair. These defects are ones which accidently form within the TFT array area, for example, as a result of an anomaly during manufacturing.)

When no gate-to-common line short exists, the potential voltage is constant along the gate line because one end of the gate line is electrically almost floating. On the other hand, when a gate-to-common short exists the potential voltage along the gate line is not constant but rather varies linearly from the feeding end (e.g., where the gate line is connected to a gate shorting bar) to the short point and then stays constant from the short point to the floating end of the gate line. The slope of linear variation of the gate potential voltage may be determined by simple calculation based on Ohmic Law, where the resistance values such as the resistance per unit length of gate line and the resistance per unit length of the common line are used. In order to locate the short point, it is preferable for the pixel voltage (Vp) to be closely influenced by the potential voltage on the gate line. This may be achieved, in one way, by initially charging Cst to a known voltage and then recharging Cst into the voltage whose value is limited by the gate voltage.

It is further noted that when a gate-to-common line short exists, the potential voltage may also not be constant along the common line. Also, its change of amplitude with time may not be constant along the common line. This variance will affect the value of Vp along the common line, which therefore may provide a further basis for detecting defects in the TFT array. This may be explained in greater detail as follows.

As previously noted, the pixel voltage profile along the gate line is another expression for the pixel voltage profile along the self-common line. And, the pixel voltage profile along the adjacent-common line is another expression for the pixel voltage profile along the adjacent-gate line. The pixel voltage $V_p$ corresponds to the storage capacitor voltage and the common line transmits the reference electric potential for the storage capacitor. The gate line transmits the gate signal to the gate electrodes of all the TFTs connected to the gate line. Thus, the variance of $V_p$ along the common line may provide a further basis for detecting gate-to-common line short defects.

In the examples which follow, the common lines are assumed to be connected to the common signal pattern at both ends, as shown in FIG. 2. Also, in these examples the following voltages will be used as test pattern signals and signals which are monitored to determine the existence and location of a gate-to-common line short in the array:

| | |
|---|---|
| $V_p$ = | pixel voltages measured along a gate line under test |
| Vgh = | high value of gate signal |
| Vgm = | middle value of gate signal |
| Vgl = | low value of gate signal |
| Vdh = | high value of data signal |
| Vdl = | low value of data signal |
| Vnn = | start and end values of data signal for positive $V_p$ |
| Vpp = | end value of data signal for negative $V_p$ |
| Vcl = | low value of common signal |
| Vch = | high value of common signal |

Given these voltages, when no defect exists in the TFT array, all the storage capacitors are charged to a predetermined voltage (e.g., Vdh) during a time period T3 in FIG. 4(a) as long as Vgh is higher than Vdh by at least Vth, which is a threshold voltage of TFT. If TFTs remain in the off state during time periods T4 and T5 (discussed in greater detail below), the pixel voltages nearly remain at Vdh until the TFT-array tester measures them. In FIG. 4(b), when there is no defect in TFT array all the storage capacitors are charged to Vdl during time period T3 as long as Vgm is higher than Vdl by at least a predetermined threshold voltage Vth. If TFTs remain in the off state during time periods T4 and T5, the pixel voltages nearly remain at Vdl until the TFT-array tester measures them. For illustrative purposes, it may be assumed in the following examples that Vgh=25, Vgm=−15, Vgl=−25, Vdh=20, Vdl=−20, Vnn=−20, Vpp=25, Vcl=−25, Vch=20, and the resistance per unit length of gate line=2* the resistance per unit length of common line.

Detection of Gate-to-Self-Common-Line Short

The method of the present invention may be adapted to detect shorts between a common line and a gate line connected to a same pixel element. A short of this type is illustratively shown by reference numeral 8 in FIG. 1(a). Examples of test patterns which may be applied to the array to detect this type of short and their corresponding signal profiles are discussed below.

Analysis of Signal Patterns for Positive Pixel Voltages

Figure 5:
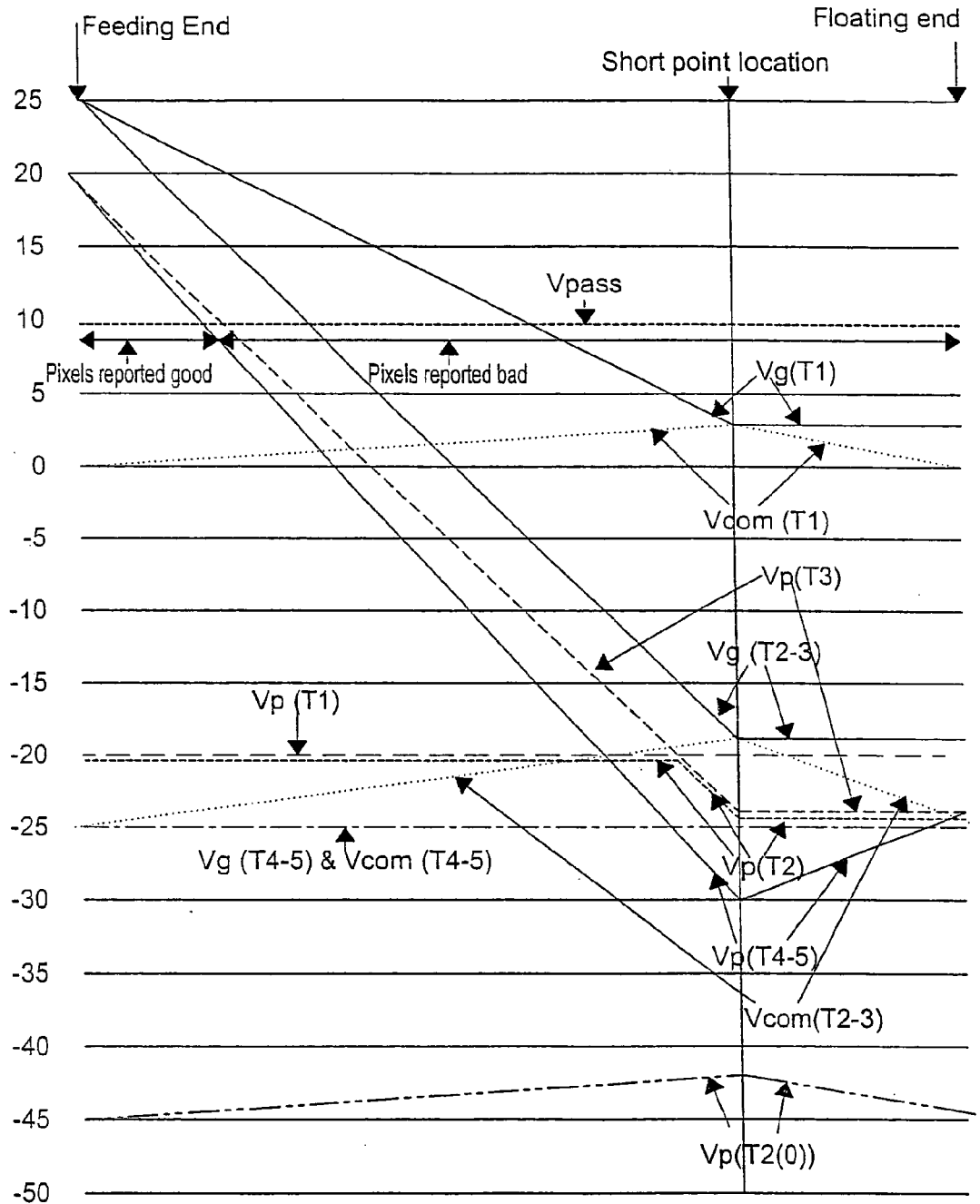
FIG. 5 is a diagram showing a profile of signal voltages (including positive pixel voltages Vp) generated in response to the test signal pattern in FIG. 4(a) along a gate line when a gate-to-self-common short is present. This profile may provide a basis for locating defects in a TFT array in accordance with the present invention.

Referring to FIG. 5, analysis of pixel voltages Vp along a gate line under test with a gate-to-self-common short is preferably performed in a step-by-step sequence using the signal patterns for positive pixel voltage set forth in FIG. 4(a). At time T1, the potential voltages along the gate line and self-common line are shown by Vg(T1) and Vcom(T1) respectively. The pixel voltage Vp is charged to Vnn as denoted by Vp(T1).

At the beginning of time period T2, the self-common signal drops from 0 to Vcl and Vcom drops from Vcom(T1) to Vcom(T2–3). This causes Vp to drop from Vp(T1) to Vp(T2(0)) but Vp charges to Vp(T2) during the T2 period because the TFT is turned on as long as Vp is lower than a predetermined amount (Vg–Vth). When Vp charges to (Vg–Vth), the TFT is turned off and Vp becomes saturated at (Vg–Vth). Since the data signal is now Vnn, the highest level of Vp(T2) is limited to Vnn.

At the beginning of time period T3, the data signal becomes Vdh and Vp(T3) becomes limited by (Vg (T3) –Vth) or Vdh whichever is lower. If Vdh is lower than (Vg (T3)–Vth) toward the feeding end, then Vp (T3) becomes saturated by Vdh and a slope change occurs toward the feeding end.

At the beginning of time period T4, the gate signal drops from Vgh to Vgl and Vcom drops from Vcom(T2–3) to Vcom (T4–5). This causes Vp to drop from Vp(T3) to Vp(4–5). Vg (T4–5) makes Vp stay at Vp (T4–5). If 10 volts is used as the Vp criteria (Vpass) above which the pixels are reported as good ones, then there will be multiple pixels reported as bad ones along the gate line with a short defect as shown in FIG. 5.

Using conventional techniques, this defect will at best be reported as a line defect even though the source of the line defect is a short defect between the gate and common lines at a specific location. Typically, the line defect is reported with the gate and data line numbers of two end points, but the location of actual short defect is not given. As can be seen from Vp(T4–5) in FIG. 5, the method of the present invention generates a final pixel voltage profile along the gate line with a short defect, which can be relied on for pinpointing with accuracy the location of the short defect by finding the lowest pixel voltage or the cross point of two lines of Vp having different slope.

Analysis of Signal Patterns for Negative Pixel Voltages

Figure 6:
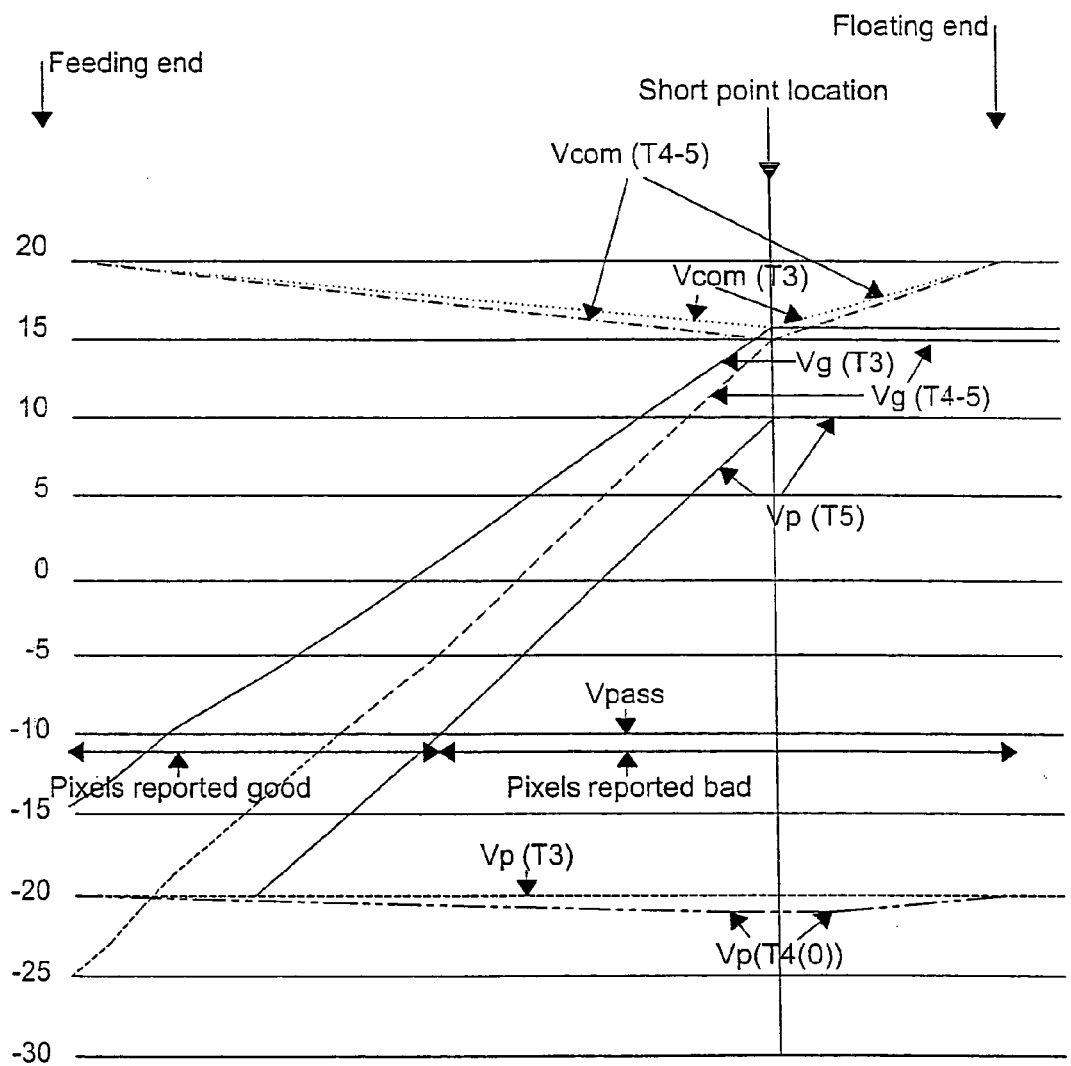
FIG. 6 is a diagram showing a profile of signal voltages (including negative pixel voltages Vp) generated in response to the test signal pattern in FIG. 4(b) along a gate line when a gate-to-self-common short is present. This profile may provide another basis for locating defects in a TFT array in accordance with the present invention.

Referring to FIG. 6, analysis of pixel voltages Vp along the gate line with a gate to self-common short is performed in a step-by-step sequence using the signal patterns for negative pixel voltage in FIG. 4(b). In this example, the values at times T1 and T2 may be considered negligible or at least not substantially affecting the end result of the analysis. Accordingly, the discussion will begin at time T3.

During time period T3, the potential voltages along the gate line and self-common line are shown by Vg(T3) and Vcom(T3) respectively. The Vp is charged to Vdl as denoted by Vp(T3). It is also noted that during time period T3, the short defect between the gate and self-common lines makes the gate signal more positive compared to the case where no such defect exists. This is because the gate line at Vgm is shorted to the self-common line at Vch, which is higher than Vgm. A higher gate signal makes the TFTs on the gate line turn on with lower on-resistance and the storage capacitors on the gate line charge to Vdl more quickly than those on other gate lines without short defect.

At the beginning time period T4, the common signal drops from Vgm to Vgl and Vcom drops from Vcom(T3) to Vcom(T4–5). This causes Vp to drop from Vp(T3) to Vp(T4(0)). Also during this time period, Vp begins to approach Vp (T3) once again since the data signal is at Vdl and Vg has a potential profile of Vg (T4–5).

At the beginning time period T5, the data signal becomes Vpp and Vp charges to Vp(T5) because Vp becomes saturated at (Vg (T5)–Vth) before reaching Vpp. If –10 volts is used as the Vp criteria (Vpass) below which the pixels are reported as good ones, then there will be multiple pixels reported as bad ones along the gate line with a short as shown in FIG. 6.

Using conventional methods, this defect would at best be reported as a line defect even though the source of the line defect is a short defect between the gate and common lines at a specific location. However, as can be seen from Vp(T5) in FIG. 6, the method of the present invention generates a final pixel voltage profile along the gate line with a short, which can be relied on to locate the short defect by finding the end of low-constant pixel voltage where Vp starts to decrease toward the feeding end.

Analysis of Pixel Patterns for both Positive and Negative Pixel Voltages

Figure 7:
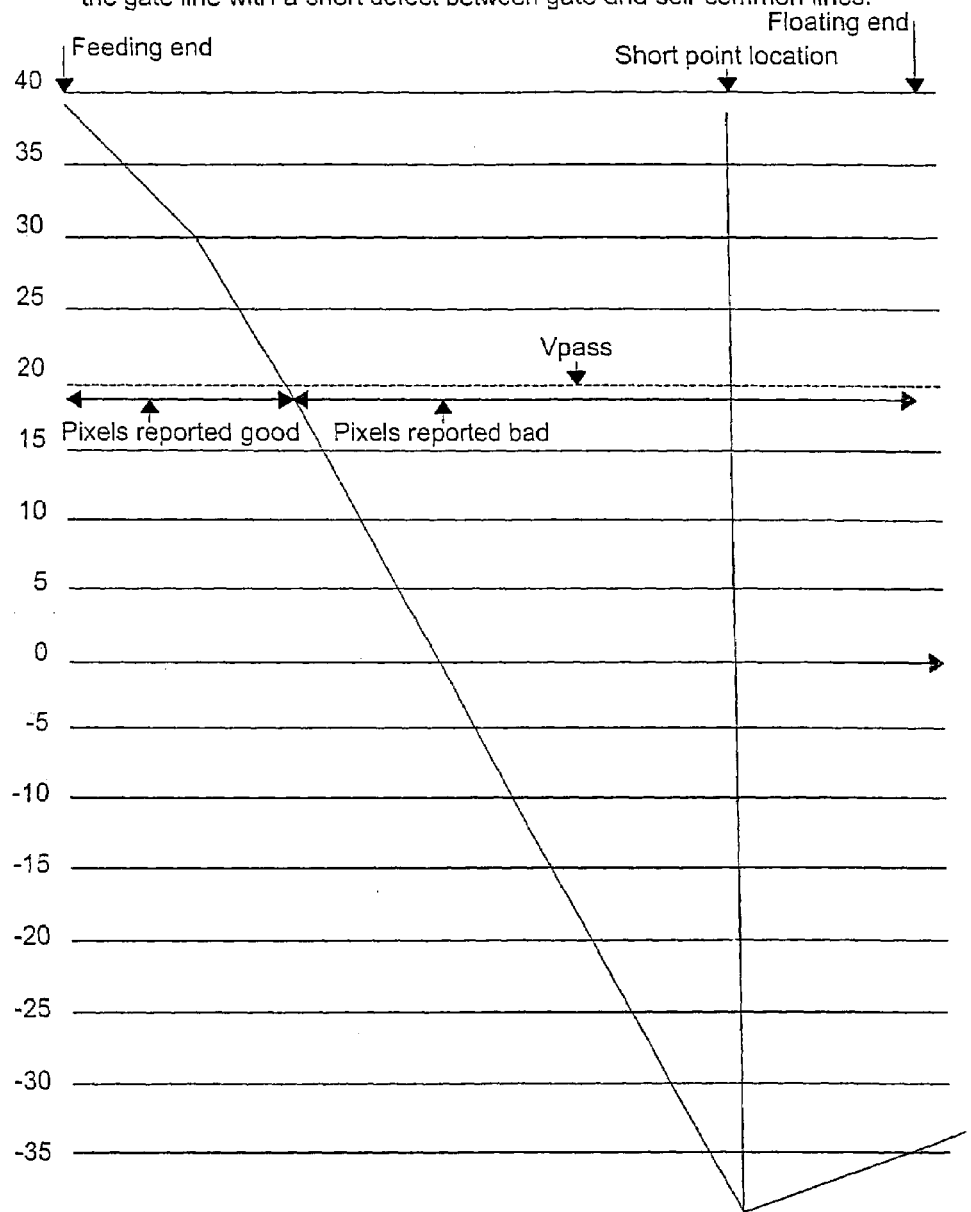
FIG. 7 is a diagram showing a profile of signal voltages generated from the positive and negative pixel voltages in FIGS. 5 and 6. This profile may be used as another basis for detecting defects in a TFT array in accordance with the present invention.

If Vp (T4–5) of FIG. 5 obtained from the test pattern of FIG. 4(a) is subtracted by Vp(T5) of FIG. 6 obtained from the test pattern of FIG. 4(b), this result may be used to generate a final pixel voltage profile along the gate line with a short defect, as shown in FIG. 7. If 20 volts is used as the Vp criteria (Vpass) above which the pixels are reported as good ones, then there will be multiple pixels reported as bad ones along the gate line with a short as shown in FIG. 7. Using conventional methods, this defect at best is reported as a line defect even though the source of the line defect is a short between the gate and common lines at certain location. As in FIG. 5, using the present invention the short defect can be located with pinpoint accuracy by finding the lowest pixel voltage or the cross point of two lines of Vp having different slope.

Detection of Gate-to-Adjacent-Common-Line Short

The method of the present invention may be adapted to detect shorts between a common line and a gate line connected to different pixel elements. A short of this type is illustratively shown by reference numeral 9 in FIG. 1(a). Examples of test patterns which may be applied to the array to detect this type of short and their corresponding signal profiles are discussed below.

Analysis of Signal Patterns for Positive Pixel Voltages

Figure 8:
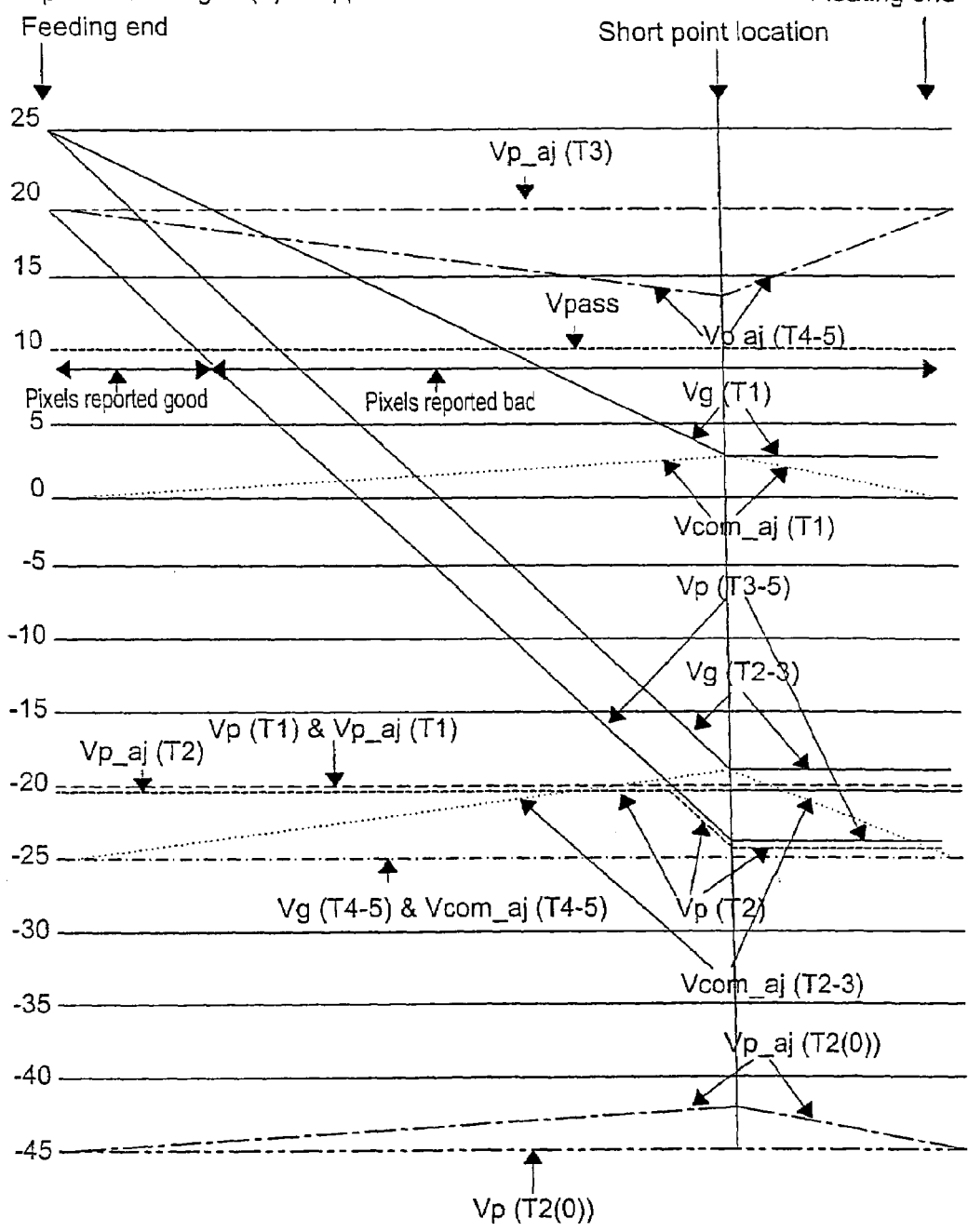
FIG. 8 is a diagram showing a profile of signal voltages (including positive pixel voltages Vp) generated in response to the test signal pattern in FIG. 4(a) along a gate line when a gate-to-adjacent-common short is present. This profile may provide a basis for locating defects in a TFT array in accordance with the present invention.

Referring to FIG. 8, analysis for pixel voltages Vp along the gate line with a short to adjacent-common line and for pixel voltages Vp_aj along the adjacent-common line with a short to adjacent gate line is performed in a step-by-step sequence using the signal patterns for positive pixel voltage in FIG. 4(a).

At time T1, the potential voltages along the gate line and adjacent-common line are shown by Vg(T1) and Vcom_aj (T1) respectively. The pixel voltage Vp of gate line is charged to Vnn as denoted by Vp(T1). The pixel voltage Vp of the adjacent-common line is charged to Vnn as denoted by Vp_aj (T1).

At the beginning time period T2, the common signal drops from 0 to Vgl and Vcom of adjacent-common line drops from Vcom_aj(T1) to Vcom_aj(T2–3). This causes Vp_aj to drop from Vp_aj(T1) to Vp_aj(T2(0)). The Vcom of gate line with a short drops from 0 to Vgl and this causes Vp to drop from Vp(T1) to Vp(T2(0)). Also, during the time period T2, Vp charges to Vp(T2) because the TFT is turned on as long as Vp is lower than a predetermined voltage (Vg–Vth), where Vth is a threshold voltage of TFT. When Vp charges to (Vg–Vth), the TFT is turned off and Vp becomes saturated at (Vg–Vth). Since the data signal is now Vnn, the highest level of Vp(T2) is limited to Vnn. The gate signal for TFTs on the adjacent-common line is now at Vgh and Vp_aj (T2) reaches Vnn.

At the beginning time period T3, the data signal becomes Vdh and Vp(T3) becomes limited by (Vg (T3)–Vth) or Vdh, whichever is lower. If Vdh is lower than (Vg (T3)–Vth) toward the feeding end, then Vp(T3) becomes saturated by Vdh and experiences a slope change toward the feeding end. The gate signal for TFTs on the adjacent-common line, however, is still at Vgh and Vp_aj (T3) reaches Vdh.

At the beginning time period T4, the gate signal drops from Vgh to Vgl and Vcom_aj drops from Vcom_aj (T2–3) to Vcom_aj (T4–5). This causes Vp_aj to drop from Vp_aj (T3) to Vp_aj (T4–5). During time periods T4 and T5, Vp_aj stays at Vp_aj (T4–5) since the gate signal for TFTs on the adjacent-common line with the short defect is at Vgl. Vg (T4–5) makes Vp stay at Vp (T3–5) since the gate signal is low enough to turn off all the TFTs on gate line with short defect. If 10 volts is used as the Vp criteria (Vpass) above which the pixels are reported as good ones, then there will be multiple pixels reported as bad ones along the gate line with a short defect as shown in FIG. 8.

Using conventional methods, this defect at best is reported as a line defect even though the source of the line defect is a short between the gate and common lines at a specific location. Typically, the line defect is reported with the gate and data line numbers of two end points, but the location of the actual short defect is not given. As can be seen from Vp (T3–5) in FIG. 8, the present invention generates a final pixel voltage profile along the gate line with a short, from which the short defect can be located by finding the end of the low-constant pixel voltage where Vp starts to increase toward the feeding end.

Analysis of Signal Patterns for Negative Pixel Voltages

Figure 9:
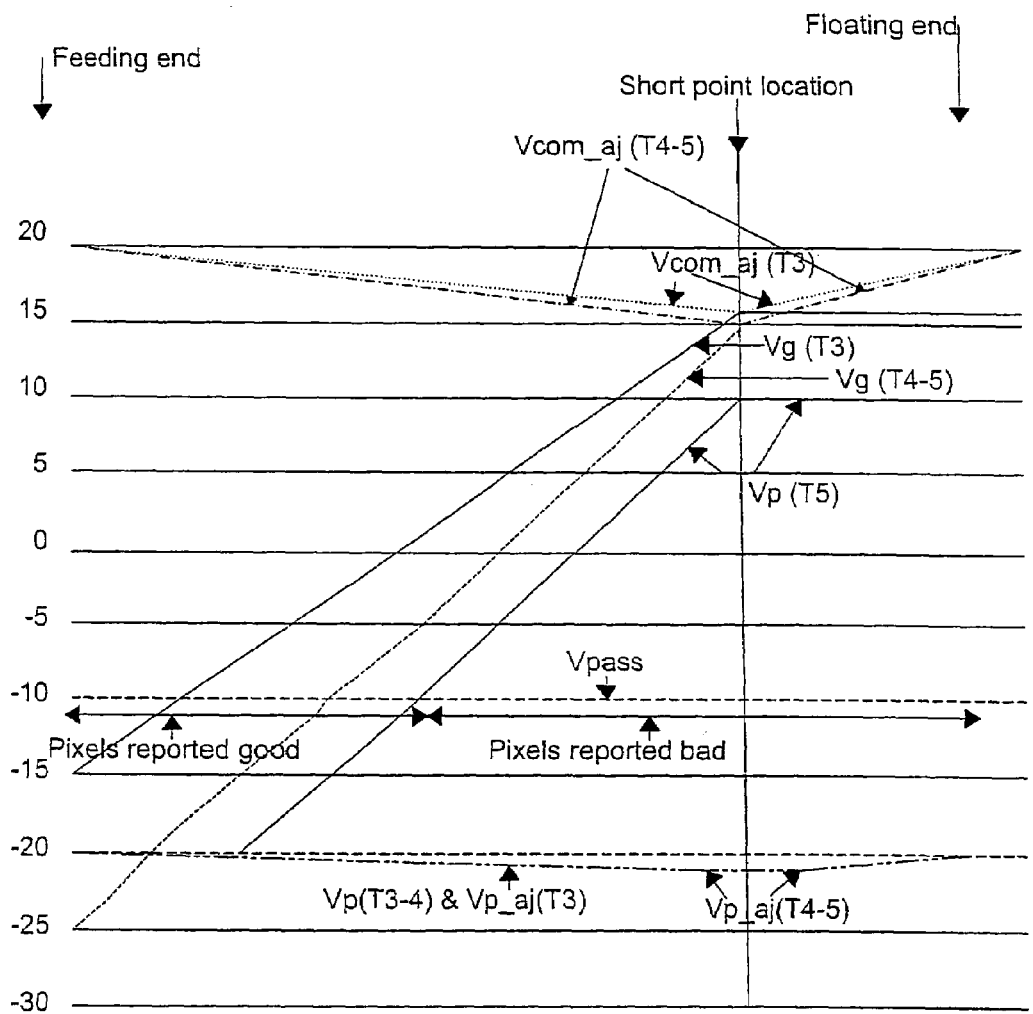
FIG. 9 is a diagram showing a profile of signal voltages (including negative pixel voltages Vp) generated in response to the test signal pattern in FIG. 4(b) along a gate line when a gate-to-adjacent-common short is present. This profile may provide another basis for locating defects in a TFT array in accordance with the present invention.

Referring to FIG. 9, analysis for pixel voltage, Vp, along the gate line with a short defect to adjacent-common line and for pixel voltage, Vp_aj, along the adjacent-common line with a short defect to adjacent gate line is done in step by step sequence using the signal patterns for negative pixel voltage in FIG. 2(*b*). In this example, the values at times T1 and T2 may be considered negligible or at least not substantially affecting the end result of the analysis. Accordingly, the discussion will begin at time T3.

At time T3, the potential voltages along the gate line and adjacent-common line are shown by Vg (T3) and Vcom_aj (T3) respectively. The Vp and Vp_aj are charged to Vdl as denoted by Vp (T3) and Vp_aj (T3) respectively. It is also noted that during time period T3, the short defect between the gate and adjacent-common lines makes the gate signal more positive compared to the case where no such defect exists because the gate line at Vgm is shorted to the adjacent-common line at Vch, which is higher than Vgm. A higher gate signal makes the TFTs on the gate line turn on with lower on-resistance and the storage capacitors on the gate line charge to Vdl more quickly than those on other gate lines without short defect. The TFTs on the adjacent-common line with the short defect receives normal gate signal and the storage capacitors on the same line charge to Vdl.

At the beginning time period T4, the common signal drops from Vgm to Vgl and the Vcom_aj drops from Vcom_aj (T3) to Vcom_aj (T4–5). This causes Vp_aj to drop from Vp_aj (T3) to Vp_aj (T4–5). During time period T4, Vp_aj stays at Vp_aj (T4–5) since the gate signal at Vgl turns off the TFTs on the adjacent-common line and Vp stays at Vp (T3–4) since the data signal is at Vdl.

At the beginning time period T5, the data signal becomes Vpp and Vp charges to Vp (T5) because Vp becomes saturated at (Vg (T5)–Vth) before reaching Vpp. If −10 volts is used as the Vp criteria (Vpass) below which the pixels are reported as good ones, then there will be multiple pixels reported as bad ones along the gate line with a short defect as shown in FIG. 9.

Using conventional methods, this defect at best is reported as a line defect even though the source of the line defect is a short between the gate and common lines at a specific location. However, as can be seen from Vp (T5) in FIG. 9, the present invention generates a final pixel voltage profile that can be used to precisely locate the short, by finding the end of low-constant pixel voltage where Vp starts to decrease toward the feeding end.

Analysis of Signal Patterns for both Positive and Negative Pixel Voltages

Figure 10:
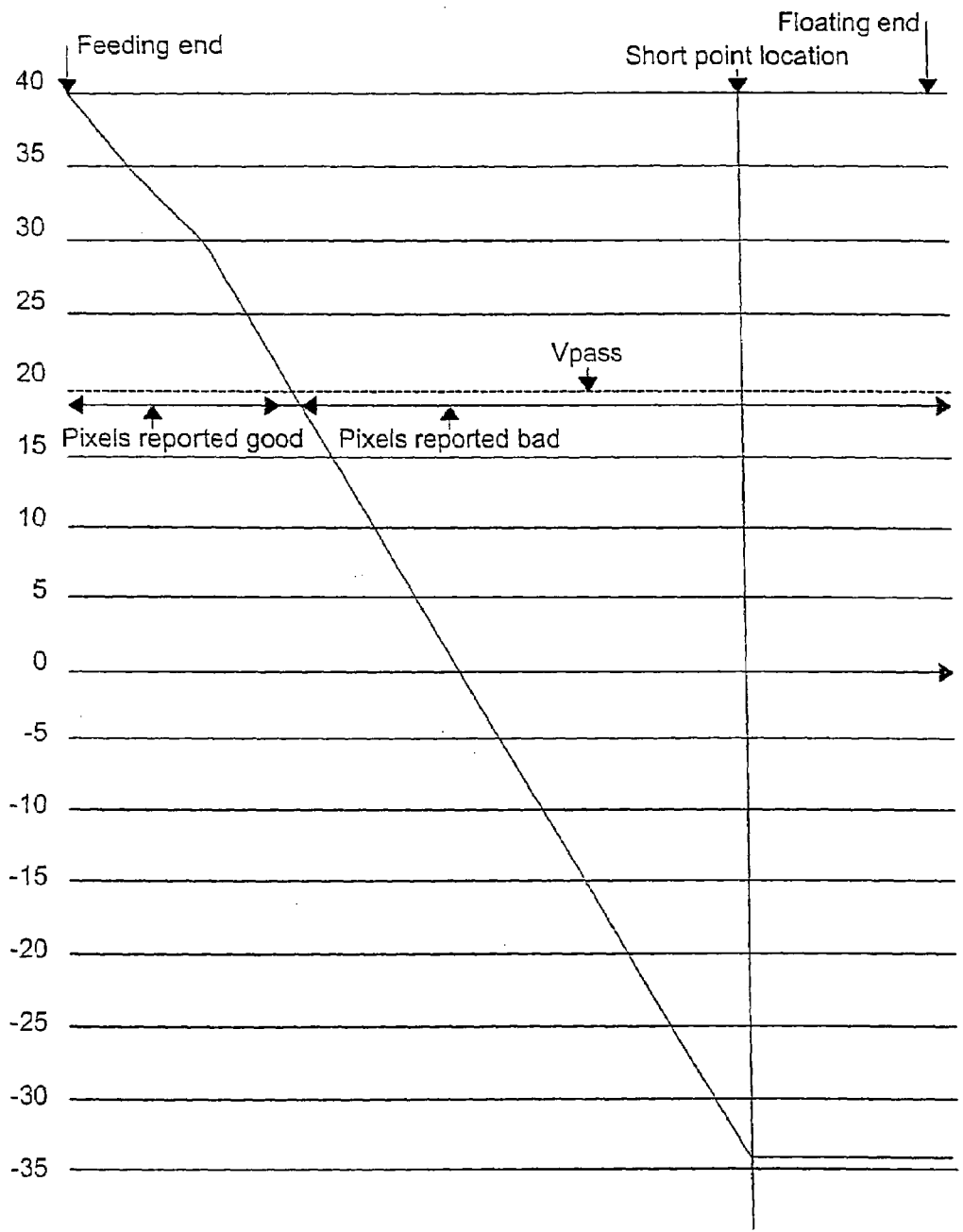
FIG. 10 is a diagram showing a profile of signal voltages generated from the positive and negative pixel voltages in FIGS. 8 and 9. This profile may be used as another basis for detecting defects in a TFT array in accordance with the present invention.

If Vp(T3–5) of FIG. 8 obtained from the test pattern of FIG. 4(*a*) is subtracted by Vp(T5) of FIG. 9 obtained from the test pattern of FIG. 4(*b*), this result may be used to generate a final pixel voltage profile along the gate line with a short defect, as shown in FIG. 10. If 20 volts is used as the Vp criteria (Vpass) above which the pixels are reported as good ones, then there will be multiple pixels reported as bad ones along the gate line with a short defect.

Using conventional methods, this defect at best is reported as a line defect even though the source of the line defect is a short between the gate and common lines at a specific location. As in FIG. 8, the short can be located defect by finding the end of the low-constant pixel voltage where Vp starts to increase toward the feeding end. Also, as can be seen from Vp_aj (T4–5) in FIGS. 8 and 9, the Vp_aj profile along the shorted adjacent-common line does not provide clearly distinctive feature to locate the gate to adjacent-common short defect, although it can generate some partial line defects depending on the value of Vpass.

Other test methodologies may be combined with the method of the present invention to improve the detection accuracy of defects in a TFT array. In this regard, it is noted that it may be considered ideal for one test methodology to detect all types of defects with very high accuracy. As previously described indicated, the present invention can detect the presence and location of gate-to-common-line short defects. For other types of defects, the present invention can detect their location with varying accuracy depending on the type, location, and/or severity of the defects. Thus, it is possible to develop new test methodology to improve the defect detection accuracy for some of the defects. It is also possible to combine the present invention with new methodologies to make use of both methods as long as they can work together, preferably without canceling each other's benefits. For example, in the case of short defects between signal lines, the presence and type of these defects can be identified by performing a preliminary test to check for leakage current between them. A more specific test method may then be used, if necessary, based on the result of the preliminary leakage test.

FIG. 11 shows a tester 70 for detecting defects in a TFT array 100 in accordance with one embodiment of the present invention. The tester includes a signal generator 80 and a processor/detector 90. The signal generator generates for input a test signal into the TFT array. This test signal may correspond to any one or more of the test signal patterns shown in FIGS. 4(*a*) and 4(*b*). The processor/detector monitors voltages produced in the TFT array as a result of the test signals and generates one or more of the previously mentioned pixel voltage profiles for purposes of detecting the presence and location of gate-to-common line shorts and/or other defects in the TFT array. The tester may also perform any of the other steps of the methods of the present invention described herein.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

I claim:

1. A method for detecting a defect in a transistor array including one or more gate lines arranged at least substantially parallel to one or more respective common lines, said method comprising:

applying a test signal to the array;
monitoring pixel voltages at different monitoring points along a gate line of the array; and
detecting a short defect between the gate line and a common line at a location where the gate line and the common line are arranged parallel to one another, the short defect being detected based on how the pixel voltages vary from one monitoring point to another monitoring point during said monitoring step.

2. The method of claim 1, wherein a common line and the gate line associated with the defect are connected to a same transistor element in the array.

3. The method of claim 1, wherein a common line and the gate line associated with the defect are connected to different transistor elements in the array.

4. The method of claim 1 further comprising:
detecting a location of the defect based on a change in slope of a profile of the pixel voltages.

5. The method of claim 1, further comprising:
detecting a location of the defect based on a rate of change in the variation of the pixel voltages along the gate line.

6. The method of claim 5, wherein the location of the defect corresponds to a point along the gate line where the variation changes from increasing pixel voltages to decreasing pixel voltages.

7. The method of claim 5, wherein the location of the defect corresponds to a point along the gate line where the variation changes from decreasing pixel voltages to increasing pixel voltages.

8. The method of claim 1, further comprising:
detecting a location of the defect based on one of a minimum value or a maximum value on a pixel voltage profile.

9. The method of claim 1, wherein the transistor array is a TFT array.

10. The method of claim 1, wherein the pixel voltage profile includes a time axis that is in one-to-one correspondence with respective locations along the gate line, and wherein the location of the short defect is determined to correspond to a point on the time axis where a rate of change in variation of the pixel voltage profile exceeds a predetermined level.

11. The method of claim 10, wherein the rate of change in variation of the pixel voltage profile exceeds said predetermined level when the pixel voltage profile transitions from a positive to a negative value or from a negative to a positive value.

12. The method of claim 10, wherein the rate of change in variation of the pixel voltage profile exceeds said predetermined level when the pixel voltage profile transitions from a minimum to a maximum value or from a maximum to a minimum value.

13. The method of claim 10, wherein the short defect is associated with a specific pixel in a display.

14. A system for detecting a defect in a transistor array including one or more gate lines arranged at least substantially parallel to one or more respective common lines, said system comprising:
a signal generator which applies a test signal pattern to the array; and
a detector which detects a short defect in the array between the gate line and a common line at a location where the gate line and the common line are arranged parallel to one another, the short defect being detected based on how pixel voltages vary between monitoring points along an array gate line.

15. The system of claim 14, wherein a common line and the gate line associated with the defect are connected to a same transistor element in the array.

16. The system of claim 14, wherein a common line and the gate line associated with the defect are connected to different transistor elements in the array.

17. The system of claim 14, wherein the detector detects a location of the defect based on a change in slope of a profile of the pixel voltages.

18. The system of claim 14, wherein the detector detects a location of the defect based on a rate of change in the variation of the pixel voltages along the gate line.

19. The system of claim 18, wherein the location of the defect corresponds to a point along the gate line where the variation changes from increasing pixel voltages to decreasing pixel voltages.

20. The system of claim 18, wherein the location of the defect corresponds to a point along the gate line where the variation changes from decreasing pixel voltages to increasing pixel voltages.

21. The system of claim 14, wherein the transistor array is a TFT array.

22. A signal analyzer for testing a TFT array including one or more gate lines arranged at least substantially parallel to one or more respective common lines, said analyzer comprising:
at least one electrode for inputting a test signal into the TFT array; and
a processor which monitors how pixel voltages vary between monitoring points along a gate line of the array, and detects a short defect associated with the gate line based on the variation, wherein the short defect is between the gate line and a common line at a location where the gate line and the common line are arranged parallel to one another.

23. The signal analyzer of claim 22, wherein the common line and the gate line are connected to a same transistor element in the array.

24. The signal analyzer of claim 22, wherein the common line and the gate line are connected to different transistor elements in the array.

25. The signal analyzer of claim 22, wherein the processor detects a location of the defect based on a change in slope of a profile of the pixel voltages.

26. The signal analyzer of claim 22, wherein the processor detects a location of the defect based on a rate of change in the variation of the pixel voltages along the gate line.

27. The signal analyzer of claim 26, wherein the location of the defect corresponds to point along the gate line where the variation changes from increasing pixel voltages to decreasing pixel voltages.

28. The signal analyzer of claim 26, wherein the location of the defect corresponds to point along the gate line where the variation changes from decreasing pixel voltages to increasing pixel voltages.

29. The signal analyzer of claim 22, wherein the transistor array is a TFT array.

* * * * *